(12) United States Patent
Wu (10) Patent No.: US 10,963,947 B2
(45) Date of Patent: Mar. 30, 2021

(54) METHOD, A DEVICE AND A SYSTEM FOR CHECKOUT

(71) Applicant: Yi Tunnel (Beijing) Technology Co.,Ltd., Beijing (CN)

(72) Inventor: Yili Wu, Beijing (CN)

(73) Assignee: YI TUNNEL (BEIJING) TECHNOLOGY CO., LTD., Beijing (CN)

( * ) Notice: Subject to any disclaimer, the term of this patent is extended or adjusted under 35 U.S.C. 154(b) by 174 days.

(21) Appl. No.: 16/330,076

(22) PCT Filed: Dec. 11, 2017

(86) PCT No.: PCT/CN2017/115444
§ 371 (c)(1),
(2) Date: Mar. 1, 2019

(87) PCT Pub. No.: WO2019/033635
PCT Pub. Date: Feb. 21, 2019

(65) Prior Publication Data
US 2019/0228457 A1    Jul. 25, 2019

(30) Foreign Application Priority Data

Aug. 16, 2017  (CN) .......................... 201710701938.X
Nov. 28, 2017  (CN) .......................... 201711213100.2

(51) Int. Cl.
*G06Q 30/00* (2012.01)
*G06Q 30/06* (2012.01)
(Continued)

(52) U.S. Cl.
CPC ..... *G06Q 30/0633* (2013.01); *G06K 9/00288* (2013.01); *G06K 9/628* (2013.01);
(Continued)

(58) Field of Classification Search
CPC ...................................................... G06Q 30/00
See application file for complete search history.

(56) References Cited

U.S. PATENT DOCUMENTS 10,475,185 B1 * 11/2019 Raghavan ............. G06T 7/0042
2007/0185756 A1   9/2007 Ann et al.
(Continued)

FOREIGN PATENT DOCUMENTS

CN  1787003 A   6/2006
CN  105518734 A  4/2016
(Continued)

OTHER PUBLICATIONS

Dorfling, Kyle, "Amazon's "Just Walk Out" tyechnology has some interesting messages for retailers", DotActiv, Dated Dec. 2016. (Year: 2016).*

(Continued)

*Primary Examiner* — Mark A Fadok
(74) *Attorney, Agent, or Firm* — United IP Counselors, LLC (57) ABSTRACT

The present invention discloses a method, a device and a system for checkout, and belongs to the technical field of computer. The checkout method comprises: identifying a pre-registered customer to acquire an identity information of the customer, the identity information containing face data and a payment account of the customer; tracking the customer whose identity information has been acquired, in a shopping place in real time, and acquiring a position of the customer; judging whether the position of the customer is consistent with a position of an item in the shopping place, and if so, associating the customer with a take-up action or a put-back action aiming at the item, and generating a shopping list of the customer after identifying the take-up action or the put-back action, and the item at which the take-up action or the put-back action aims; and performing (Continued)

checkout of the shopping list. The present invention further discloses a checkout device comprising a top camera, a forward camera, a downward camera and a server. The present invention further discloses a checkout system comprising a client and a checkout device. According to the above-mentioned technical solutions of the present invention, the situations that workload is heavy due to the adhesion of Radio Frequency identification (RFID) tags and RFID tags are easily be damaged may be avoided.

8 Claims, 5 Drawing Sheets

(51) Int. Cl.
*G06K 9/00* (2006.01)
*G06T 7/70* (2017.01)
*G06T 7/20* (2017.01)
*G06K 9/62* (2006.01)
*H04N 5/247* (2006.01)
*H04N 5/225* (2006.01)

(52) U.S. Cl.
CPC .............. *G06K 9/6217* (2013.01); *G06T 7/20* (2013.01); *G06T 7/70* (2017.01); *H04N 5/2257* (2013.01); *H04N 5/247* (2013.01); *G06K 2209/21* (2013.01); *G06T 2207/30196* (2013.01); *H04N 5/2253* (2013.01)

(56) References Cited

U.S. PATENT DOCUMENTS

2013/0336524 A1* 12/2013 Zhang ................ G06K 9/00355
382/103
2015/0039458 A1* 2/2015 Reid .................. G06K 9/00771
705/26.1

FOREIGN PATENT DOCUMENTS

| CN | 106204240 A | 7/2016 |
|---|---|---|
| CN | 106557791 A | 4/2017 |

OTHER PUBLICATIONS

International Search Report issued in International Patent Application No. PCT/CN2017/115444, dated Apr. 12, 2018.

* cited by examiner

```
┌─────────────────────────────────────────────────────────────────────┐
│ performing target detection on the plurality of acquired frames of  │ ─ S31
│ hand images containing the item to obtain a plurality of rectangular│
│ area images correspondingly, wherein the rectangular area images are│
│ images corresponding to rectangular areas containing the item, and  │
│ the plurality of frames of hand images corresponds to a plurality of│
│ cameras in a one-to-one manner                                      │
└─────────────────────────────────────────────────────────────────────┘
                                   │
┌─────────────────────────────────────────────────────────────────────┐
│ acquiring a plurality of primary classification results             │ ─ S32
│ correspondingly, according to the plurality of rectangular area     │
│ images and a pre-trained first-level classification model, and      │
│ acquiring a first-level classification result of the plurality of   │
│ frames of hand images, according to the plurality of primary        │
│ classification results and a pre-trained first-level linear         │
│ regression model, wherein the pre-trained first-level classification│
│ model is a model that is constructed by an image identification     │
│ technique of convolutional neural network and trained by all the    │
│ items in the shopping place                                         │
└─────────────────────────────────────────────────────────────────────┘

┌─────────────────────────────────────────────────────────────────────┐
│ obtaining a plurality of secondary classification results           │
│ correspondingly, according to the plurality of rectangular area     │
│ images and a pre-trained second-level classification model,         │
│ acquiring a second-level classification result of the plurality of  │
│ frames of hand images, according to the plurality of secondary      │
│ classification results and a pre-trained second-level linear        │
│ regression model, and using the second-level classification result  │
│ as the first classification result, in case that the first-level    │ ─ S35
│ classification result is a similar item, wherein the second-level   │
│ classification model being a model that is constructed by the image │
│ identification technique of convolutional neural network and trained│
│ by items in a similar item group in the shopping place in advance;  │
│ otherwise, executing the step (S33)                                 │
└─────────────────────────────────────────────────────────────────────┘
                                   │
┌─────────────────────────────────────────────────────────────────────┐
│     using the first-level classification result as a first          │ ─ S33
│                    classification result                            │
└─────────────────────────────────────────────────────────────────────┘
                                   │
┌─────────────────────────────────────────────────────────────────────┐
│        using the first classification result as a to-be-identified  │ ─ S34
│                              item                                   │
└─────────────────────────────────────────────────────────────────────┘
```

METHOD, A DEVICE AND A SYSTEM FOR CHECKOUT

BACKGROUND

Field of Invention

The present invention belongs to the technical field of computer, and particularly relates to a method, a device and a system for checkout.

Background of the Invention

When a customer saw an item he likes or requires in a shopping place, such as a supermarket, a store and the like, he needs to perform checkout with an operator of the shopping place to obtain the item. Generally, the checkout is completed in the customer queuing manner beside a cashier counter.

With the development of the artificial intelligence technology, the checkout mode is also changing. For example, after walking into the shopping place and selecting an item, the customer can perform checkout and leave immediately without queuing and waiting at the cashier counter, which is commonly known as the checkout mode of "Just Walk Out".

In the prior art, the solution of "Just Walk Out" is implemented mainly on the basis of the Radio Frequency identification (RFID) technology. Upon application, a small radio frequency module which does not require a battery is adhered to the item. When the item is passed through a checkout counter (or a checkout area) provided with a RFID detection device, the checkout counter can emit a wireless signal to the item. After receiving the signal, the small radio frequency module feeds back a signal carrying ID information of the item to the checkout counter, and the checkout counter generates a bill for checkout according to the ID information. The method has the following defects. because the small radio frequency module is necessary to be adhered to each item, the workload is extremely heavy for workers in the shopping place and the cost is high. Moreover, if the small radio frequency module falls from the item or is damaged naturally or artificially, the checkout counter cannot identify the item, resulting in a loss for a merchant. In addition, if a RFID is adhered to some metal items, a signal shielding problem may be occurred.

SUMMARY

In order to solve the problems that the workload for adhering RFID tags is heavy and RFID tags may be easily damaged in the prior art, in one aspect, the present invention provides a checkout method, comprising the steps of: (S1) identifying a pre-registered customer to acquire an identity information of the customer, the identity information containing face data and a payment account of the customer; (S2) tracking the customer whose identity information has been acquired, in a shopping place in real time, and acquiring a position of the customer; (S3) judging whether the position of the customer is consistent with a position of an item in the shopping place, and if so, associating the customer with a take-up action or a put-back action aiming at the item, and generating a shopping list of the customer after identifying the take-up action or the put-back action, and the item at which the take-up action or the put-back action aims; and (S4) performing checkout of the shopping list.

In the checkout method as mentioned above, preferably, in the step (S3), judging whether the position of the customer is consistent with the position of the item in the shopping place specifically comprises: representing the position of the item with a position of a forward camera which is mounted on a shelf for bearing the item and is used for shooting forwards, in case that the identity information of the customer represented by an image containing the customer, which is shot by the forward camera, is the same as the identity information acquired in the step (S1), judging that the position of the customer is consistent with the position of the item in the shopping place.

In the checkout method as mentioned above, preferably, in the step (S3), identifying the take-up action or the put-back action specifically comprises: acquiring a plurality of frames of consecutive hand images of the customer in front of the shelf for bearing the item, and establishing a motion track of a hand for the plurality of frames of consecutive hand images on a timeline, in case that it is detected that the motion track of the hand is an inward movement from the outside of a predetermined virtual action boundary and the item is taken in the hand, identifying the action as the put-back action; in case that it is detected that the motion track of the hand is an outward movement from the inside of the virtual action boundary and the item is taken in the hand, identifying the action as the take-up action, wherein the outside of the virtual action boundary is in a direction away from the shelf, and the inside of the virtual action boundary is in a direction close to the shelf.

In the checkout method as mentioned above, preferably, in the step (S3), identifying the item at which the take-up action or the put-back action aims specifically comprises the steps of: (S31) performing target detection on the plurality of acquired frames of hand images containing the item to obtain a plurality of rectangular area images correspondingly, wherein the rectangular area images are images corresponding to rectangular areas containing the item, and the plurality of frames of hand images corresponds to a plurality of cameras in a one-to-one manner; (S32) acquiring a plurality of primary classification results correspondingly, according to the plurality of rectangular area images and a pre-trained first-level classification model, and acquiring a first-level classification result of the plurality of frames of hand images, according to the plurality of primary classification results and a pre-trained first-level linear regression model, wherein the pre-trained first-level classification model is a model that is constructed by an image identification technique of convolutional neural network and trained by all the items in the shopping place; (S33) using the first-level classification result as a first classification result; and (S34) using the first classification result as a to-be-identified item.

In the checkout method as mentioned above, preferably, after the step (S32) and before the step (S34), the method further comprises the step of: (S35) obtaining a plurality of secondary classification results correspondingly, according to the plurality of rectangular area images and a pre-trained second-level classification model, acquiring a second-level classification result of the plurality of frames of hand images, according to the plurality of secondary classification results and a pre-trained second-level linear regression model, and using the second-level classification result as the first classification result, in case that the first-level classification result is a similar item, wherein the second-level classification model being a model that is constructed by the image identification technique of convolutional neural network and trained by items in a similar item group in the shopping place in advance; otherwise, executing the step (S33).

In another aspect, the present invention further provides a checkout device, comprising: a registration module configured to receive identity information inputted by a customer upon registration and acquire the identity information of the customer who intends to enter a shopping place; a real-time tracking module configured to be connected with the registration module and configured to track the customer, whose identity information has been acquired by the registration module, in the shopping place in real time, and acquire a position of the customer; a shopping list generation module configured to be connected with the real-time tracking module and configured to judge whether the position of the customer acquired by the real-time tracking module is consistent with a position of an item in the shopping place, and if so, associate the customer with a take-up action or a put-back action aiming at the item, and generate a shopping list of the customer after identifying the take-up action or the put-back action and the item at which the take-up action or the put-back action aims; and a checkout module configured to be connected with the shopping list generation module and configured to perform checkout of the shopping list generated by the shopping list generation module.

In the checkout device as mentioned above, preferably, the shopping list generation module comprises: an association unit configured to represent the position of the item with a position of a forward camera, which is mounted on a shelf for bearing the item and used for shooting forwards, in case that the identity information of the customer represented by an image containing the customer, which is shot by the forward camera, is the same as the identity information acquired by the registration module, judge that the position of the customer is consistent with the position of the item in the shopping place; an action identification unit configured to acquire a plurality of frames of consecutive hand images of the customer in front of the shelf for bearing the item, and establish a motion track of the hand for the plurality of frames of consecutive hand images on a timeline, in case that it is detected that the motion track of the hand is an inward movement from the outside of a predetermined virtual action boundary and the item is taken in the hand, identify the action as the put-back action; in case that it is detected that the motion track of the hand is an outward movement from the inside of the virtual action boundary and the item is taken in the hand, identify the action as the take-up action, wherein the outside of the virtual action boundary is in a direction away from the shelf, and the inside of the virtual action boundary is in a direction close to the shelf; an item identification unit configured to identify the item at which the take-up action or the put-back action aims; and a shopping list generation unit configured to generate the shopping list of the customer, according to the identity information of the customer determined by the association unit, the take-up action or the put-back action identified by the action identification unit, and the item at which the take-up action or the put-back action aims and identified by the item identification unit.

In the checkout device as mentioned above, preferably, the item identification unit comprises: a target detection subunit configured to perform target detection on the plurality of frames of hand images containing the item which are acquired by the action identification unit, in order to obtain a plurality of rectangular area images correspondingly, wherein the rectangular area images are images corresponding to rectangular areas containing the item, and the plurality of frames of hand images correspond to a plurality of cameras in a one-to-one manner; a first classification subunit configured to acquire a plurality of primary classification results correspondingly, according to the plurality of rectangular area images and a pre-trained first-level classification model, and acquire a first-level classification result of the plurality of frames of hand images according to the plurality of primary classification results and a pre-trained first-level linear regression model, wherein the pre-trained first-level classification model is a model that is constructed by an image identification technique of convolutional neural network and trained by all the items in the shopping place; a confirmation unit configured to use the first-level classification result as a first classification result; and a result determination unit configured to use the first classification result as a to-be-identified item.

In yet another aspect, the present invention further provides a checkout device, comprising: a top camera configured to shoot downwards from the top of a shopping place to track a customer, whose identity information has been acquired, in the shopping place in real time; a forward camera configured to shoot towards the front of a shelf to acquire an image of the customer positioned in front of the shelf for bearing an item; a lower camera configured to shoot downwards to acquire a hand image of the customer; a processor; and a memory that records processor-executable instructions, wherein the processor is configured to identify the pre-registered customer to acquire the identity information containing face data and a payment account of the customer, control the top camera to track the customer, whose identity information has been acquired, in real time and acquire a position of the customer, judge whether the position of the customer is consistent with a position of the item in the shopping place, which is acquired by controlling the forward camera, and if so, associate the customer with a take-up action or a put-back action aiming at the item, generate a shopping list of the customer after identifying the take-up action or the put-back action and the item at which the take-up action or the put-back action aims according to the hand image acquired by the lower camera, and perform checkout of the shopping list.

In still a further aspect, the present invention further provides a checkout system, comprising: a client terminal configured to receive identity information inputted by a customer upon registration and send the identity information to a checkout device, and configured to receive a shopping list issued by the checkout device; and the above-mentioned checkout device.

The embodiments of the present invention bring out the following beneficial effects by the above-mentioned technical solutions.

The operation cost is low, since the workload caused by adhesion of RFID is saved, compared with a RFID solution. The application range is wide, since the present invention is applicable to any item, and is not restrained by attributes of the item, such as forms, materials and the like. The user experience is good, since the customer can acquire corresponding information immediately after taking an item.

BRIEF DESCRIPTION OF THE DRAWINGS

FIG. 3 is a schematic flowchart of another image identification method based on the convolutional neural network provided in an embodiment of the present invention;

DETAILED DESCRIPTION OF THE EMBODIMENTS

In order to make objects, technical solutions and advantages of the present invention more apparent, the embodiments of the present invention will be further described in detail below in connection with the drawings.

Figure 1:
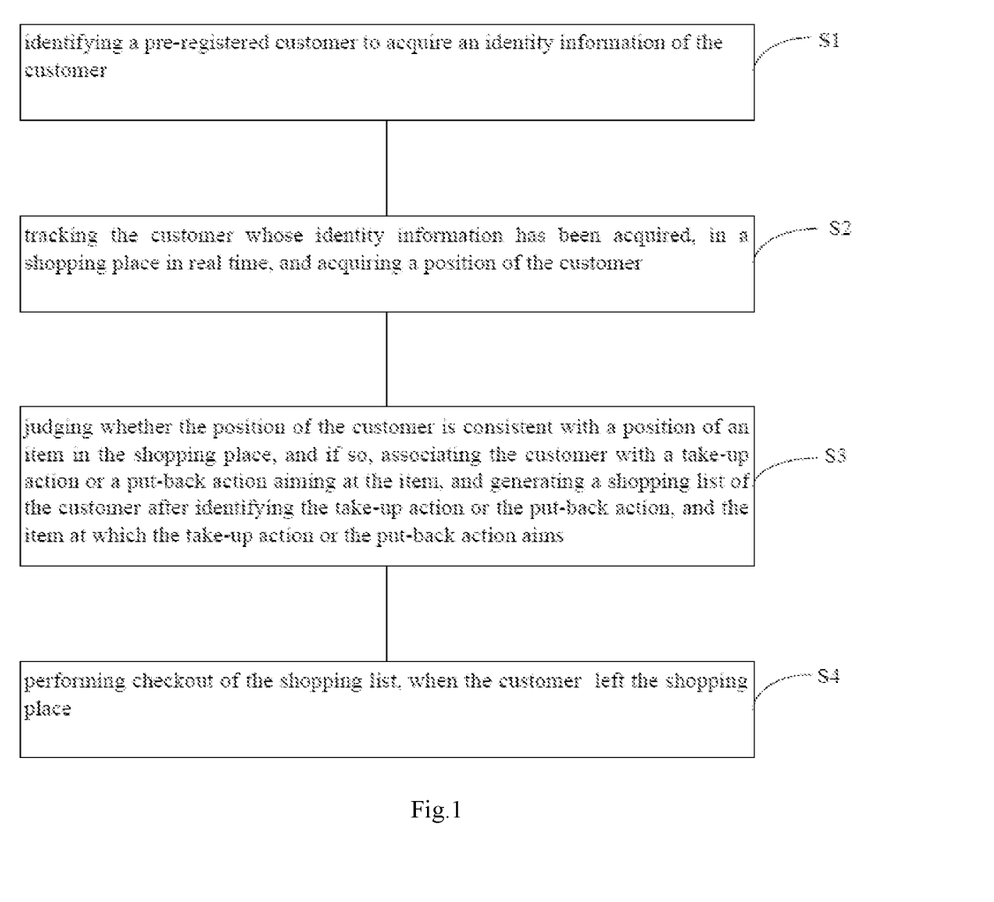
FIG. 1 is a schematic flowchart of the checkout method provided in an embodiment of the present invention.

An embodiment of the present invention provides the checkout method. With reference to FIG. 1, the method comprises the following steps of S1 to S4.

In the step S1, a pre-registered customer is identified to acquire identity information of the customer.

Specifically, before the customer enters a shopping place, such as a store, a supermarket, an Application (App) corresponding to the checkout method needs to be installed on mobile communication equipment of the customer, such as a mobile phone and a tablet personal computer, so as to complete registration of the customer. The identity (ID) information of the customer, which is acquired during registration, includes but is not limited to face data and a payment account of the customer. The payment account may be a bank account and may also be a third-party payment account, such as Alipay, WeChat Pay, QQ Wallet, JD Wallet, and the like, and the identity information may also include the name, mobile phone number, ID number, gender and profession. The registration of the customer may also be completed by an applet (or called as WeChat applet) corresponding to the checkout method in WeChat. The registration of the customer may also be completed by subscribing a WeChat official account corresponding to the checkout method. Then, the customer scans a two-dimensional code at a doorway of the shopping place by the App or the applet or the official account, or a store scans a two-dimensional code generated by the App on the mobile communication equipment held by the customer to implement verification on the ID of the customer, i.e., identify that the customer is one of the registered users, so as to acquire the identity information corresponding to the customer, in other words, it is known who is the customer entering the shopping place. After the identity information of the customer is acquired, a door lock of the shopping place may be unlocked automatically, then the customer may open a door by pushing the door inwards or pulling the door outwards or pushing the door horizontally, and enter the shopping place to select items. If the customer has not completed registration, the customer can be identified as a non-registered user, and the door lock in the shopping place remains locked, so the customer cannot enter the shopping place. In other embodiments, a biometric identifier, such as a fingerprint identifier and a face identifier, can be arranged at the doorway of the shopping place to identify the ID of the customer in the shopping place by biometric identification technology. When the customer registers on the App, the biological data of the customer, such as fingerprint data, may be collected. The door of the shopping place may be opened by a worker after the identity information of the customer is acquired.

In the step S2, the customer whose identity information has been acquired is tracked in the shopping place in real time, so as to acquire a position of the customer.

When the customer enters the shopping place, his identity is necessary to be identified. The identified customer freely moves and takes up or puts back items in the shopping place. If it is required to master the identity information of each customer in the shopping place at any moment, the customer in the shopping place needs to be continuously tracked after the identity of the customer entering the shopping place is confirmed, i.e., the customer needs to be positioned in real-time.

Specifically, a top camera is deployed at the top in the shopping place. The top camera can shoot a video stream of movement of the customer in the shopping place. By analyzing the video stream and comparing the difference between the adjacent frames in the video stream, real-time positioning of the customer in the shopping place is implemented. A plurality of top cameras can be deployed on a ceiling so as to enable a shooting range to cover the overall store, and a shooting direction of the top camera is slantingly downward. When the customer enters the store, the identity of the customer is identified. After the customer entered the store, the top camera on the ceiling carries out shooting from top to bottom to acquire an image of the customer in real time and binds the image with the identity information of the customer, i.e., the identity information of the customer moving in the store is known. With the movement of the customer in the different positions of the shopping place, other top cameras can always keep tracking the customer so as to position the customer in the shopping place.

In the step S3, if the position of the customer is consistent with a position of an item in the shopping place, the customer is associated with a take-up action or a put-back action aiming at the item; and a shopping list of the customer is generated, after identifying the item at which the take-up action or the put-back action aim.

Specifically, after entering the store, the customer may move in the store. When seeing the item the customer likes, the customer may stay in front of a shelf for bearing the item, and then carry out a take-up action on the item, which shows that the item belongs to a to-be-purchased item, or carry out a put-back action, which shows that the item does not belong to a to-be-purchased item. The current position of the customer can be acquired by step S2. If the current position is consistent with the position of the item, a person performing the take-up action or the put-back action aiming at the item on the shelf is marked as the customer, in other words, the customer is associated with the take-up action or the put-back action aiming at the item on the shelf, so as to know which customer carries out the take-up action or the put-back action aiming at the item on the shelf in front of the shelf. After the item at which the take-up action or the put-back action aims is identified, a shopping list corresponding to the customer can be generated. The position of the item can be represented with a position of a camera which is arranged on the shelf and used for shooting forwards. When the customer moves to the front of the shelf to select an item, the camera for shooting forwards can shoot an image of the customer. If customer information contained in the image is consistent with the identified identity information of the customer, it is determined that the position of the customer is consistent with the position of the item. When the customer applies the take-up action on the item, the item can be correspondingly added in the shopping list of the customer; and when the customer applies the put-back action to the item, the item can be corresponding deleted from the shopping list, i.e., the shopping list can be updated in real time according to the take-up action or the put-back action of the customer.

A method to judge whether the action on the item is the take-up action or the put-back action may adopt the following steps.

A motion track of a hand is established on a timeline according to a plurality of collected frames of consecutive hand images of the customer in front of a shelf, and whether the customer applies the take-up action or the put-back action to the item is judged according to the hand motion track. For example, a camera is deployed at the upper portion of the shelf and a shooting angle of the camera is downward, so that a shooting range of the camera covers the shelf. Preferably, a plurality of cameras are provided, so that multi-angle shooting can be guaranteed and an accuracy of identifying item is improved. The camera can shoot a plurality of frames of images per second, e.g., 30 frames. The hand images of the customer captured by the camera are detected frame by frame. The position of the hand in each frame of hand image is marked and saved. The above-mentioned operations are repeated for every frame. In this way, one motion track of the hand can be obtained on the timeline. Not only the position of the hand in each frame of image can be obtained, but also whether the item is taken in the hand can be judged and a category of the item can be confirmed according to a certain frame of hand image.

Specifically, a virtual action boundary is marked in the hand image, and the action boundary is spaced a certain distance, such as 10 cm or 20 cm from the shelf. in case that it is detected that the motion track of the hand is a movement from a position away from the shelf through the action boundary to a position close to the shelf, briefly, a movement from the outside of the action boundary to the inside of the action boundary, and the item is taken in the hand, then it is considered that the hand action is a put-back action on the item; and in case that it is detected that the motion track of the hand is a movement from a position close to the shelf through the action boundary to a position away from the shelf, briefly, a movement from the inside of the action boundary to the outside of the action boundary, and the item is taken in the hand, then it is considered that the hand action is a take-up action on the item.

The camera continuously captures video data, shoots a plurality of (such as dozens of) frames of hand images per second. One frame of hand image at an interval of one second can be obtained, so as to cut out a hand position, and classify (or called as identify) the item in the hand. This can be implemented by a pre-trained classification model described below.

Figure 2:
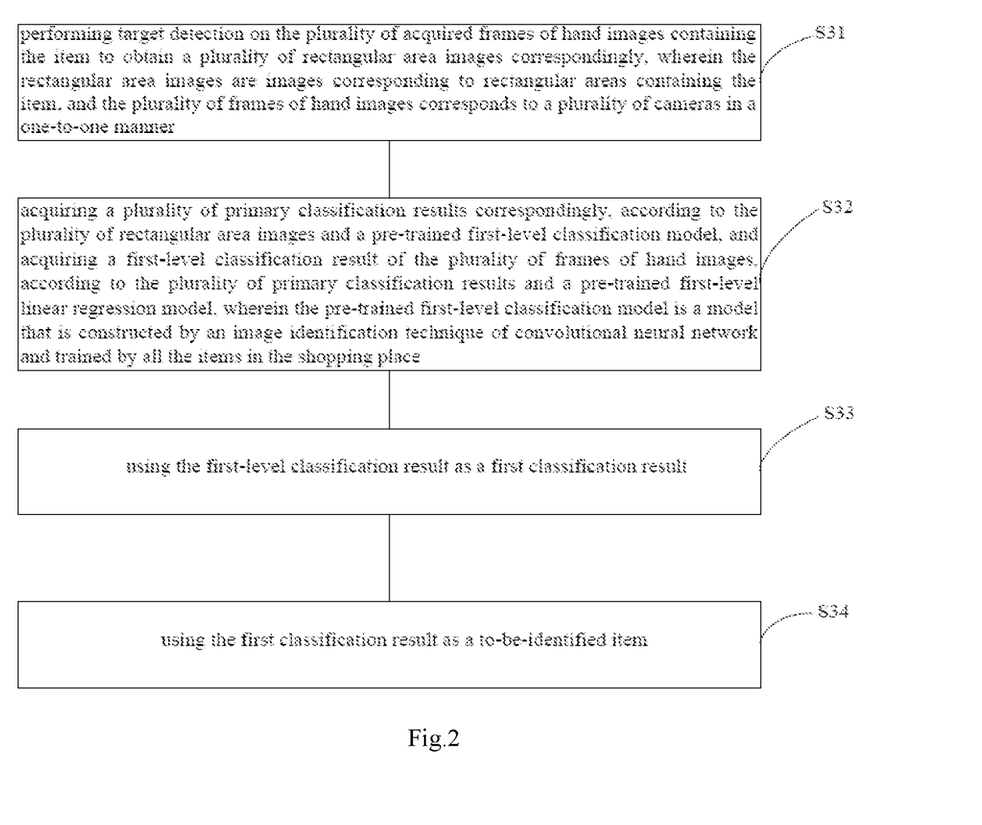
FIG. 2 is a schematic flowchart of an image identification method based on the convolutional neural network provided in an embodiment of the present invention.

With reference to FIG. 2, a method for performing identification on the item at which the take-up action or the put-back action aims can adopt the following steps of S31 to S35.

In the step S31, target detection on the plurality of frames of hand images containing the item is performed so as to obtain a plurality of rectangular area images correspondingly, in which the rectangular area images are images corresponding to rectangular areas containing the item, and the plurality of frames of hand images correspond to a plurality of cameras in a one-to-one manner.

Specifically, when target detection is carried out on the hand image, a rectangular case (or called as the rectangular area) containing the item can be marked out on the hand image. An image corresponding to the rectangular case is an image for performing classification on the item. In order to acquire multiple frames of hand images, a plurality of cameras needs to be arranged. The camera can be arranged right above the item, and in this case, the camera shoots downwards from right above. The cameras can also be arranged obliquely above the item, and in this case, the cameras shoot the item obliquely downwards. Alternatively, a part of the cameras can be arranged right above the item, and the other part of the cameras can be arranged obliquely above the item. It should be noted that no matter where the cameras are arranged, a distance from each camera to the ground can be either equal or unequal, which is not limited in the embodiment.

In the step S32, a plurality of primary classification results is acquired correspondingly, according to the plurality of rectangular area images and a pre-trained first-level classification model, and a first-level classification result of the plurality of frames of hand images is acquired according to the plurality of primary classification results and a pre-trained first-level linear regression model, in which the pre-trained first-level classification model is a model that is constructed by an image identification technique of convolutional neural network and trained by all items in the shopping place.

Specifically, data are collected in advance to establish a data set, and the collecting of the data comprises: 1) shooting all items in the shopping place from each angle and in each attitude to acquire a great amount of photos; and 2) labeling those photos, i.e., labeling positions, sizes and categories of the items in the photos. The data included in the data set means the above-mentioned photos and labels on those photos. The first-level classification model is a model constructed by an image identification technique of convolutional neural network, and is trained by using the data of all items in the shopping place. The training can be carried out in a gradient descent mode.

The trained first-level classification model classifies the item in each rectangular area image to obtain the primary classification result. The primary classification result is an n-dimensional vector, where n represents the total number of items in a shopping place. Each element in the vector represents a probability that the to-be-classified item belongs to each of the n items according to the first-level classification model. When the element has a maximum value in the vector, it means that the to-be-classified item is an item corresponding to the element according to the model. When there are five rectangular area images, the number of primary classification results is 5 n-dimensional vectors.

When the first-level classification model is trained, the primary classification results outputted by the first-level classification model are used as inputs of the first-level linear regression model, and correct classifications of the items included in the hand images corresponding to the primary classification results are used as outputs of the first-level linear regression model, so as to train the first-level linear regression model. The trained first-level linear regression model carries out data fusion on the plurality of primary classification results to obtain one first-level classification result. The first-level classification result represents that the first-level linear regression model predicts to which category of item in the shopping place the item in the image belongs.

In the step S33, the first-level classification result is used as the first classification result.

There are various items in the shopping place. Among the various items, there may be some items which are similar in appearance and may easily be visually confused. Such items are called as similar items, e.g., Golden Delicious apples and yellow snowflake pears. If single to-be-classified item is similar items, the first-level classification model is difficult to accurately classify the items. For example, Golden Delicious apples are confused with yellow snowflake pears and Golden Delicious apples are classified as yellow snowflake pears. Thus, with reference to FIG. 3, after the step S32, the undermentioned step S35 needs to be executed; otherwise, the step S33 is executed, i.e., the first-level classification result is directly used as the first classification result for checkout.

Specifically, in the step S35, if the first-level classification result is similar items, then a plurality of secondary classification results are correspondingly acquired according to the plurality of rectangular area images and a pre-trained second-level classification model, a second-level classification result of the plurality of frames of hand images is acquired according to the plurality of secondary classification results and a pre-trained second-level linear regression model, and the second-level classification result is used as a first classification result. The second-level classification model is a model that is constructed by the image identification technique of convolutional neural network and trained by items in a similar item group in the shopping place in advance.

Specifically, the second-level classification model is trained by utilizing data of the similar items in the data set established in the step S32, and the training can be carried out in a gradient descent mode. The second-level classification model differs from the first-level classification model in that different data are used in the training process, in which the data used by the first-level classification model are data of all the items in the shopping place, and the data used by the second-level classification model are the data of the similar items in the shopping place.

The trained second-level classification model classifies the item in each rectangular area image to obtain the secondary classification result. The secondary classification result is also a m-dimensional vector, and each element in the vector represents a probability that the single to-be-classified item belongs to each of m similar items according to the second-level classification model. When there are five rectangular area images, the number of the secondary classification results is 5 m-dimensional vectors, where m is smaller than or equal to n and represents the total number of the similar items in the shopping place.

In practice, there are multiple groups of similar items in the shopping place. For example, one group of similar items comprise Golden Delicious apples and yellow snowflake pears, another group of similar items comprise loose-packed salt and loose-packed white sugar, and yet another group of similar items comprise dietary alkali and flour. One second-level classification model can be trained for all the groups of similar items. In order to further improve accuracy of item classification, one second-level classification model is trained for each group of similar items. At this point, if the first-level classification result is similar items, the second-level classification model corresponding to the first-level classification result is used.

When the second-level classification model is trained, the secondary classification results outputted by the second-level classification model are used as inputs of the second-level linear regression model, and correct classifications of the items included in the images corresponding to the secondary classification results are used as outputs of the second-level linear regression model, so as to train the second-level linear regression model. The trained second-level linear regression model carries out data fusion on the plurality of secondary classification results to obtain one second-level classification result, and the second-level classification result is used as a first classification result. The second-level classification result represents that the second-level linear regression model predicts to which category of item in the shopping place the item in the image belongs.

In the step S34, the first classification result is used as the to-be-identified item.

After the first classification result is acquired, an item price corresponding to the first classification result is acquired, and thus the cost that the customer needs to pay for the selected item is determined.

In the step S4, the checkout of the shopping list of the customer is performed, after the customer left the shopping place.

When the customer selected the items and left the shopping place through the door of the shopping place from inside to outside, the customer is determined to be in a state of leaving the shopping place, and the checkout is performed according to the shopping list of the customer. For example, the cost corresponding to the shopping list is deducted from the payment account inputted upon registration of the customer.

In order to facilitate verification of the customer on the purchased items, a identification result can also be sent to the customer in real time. For example, the identification result of each item can be uploaded to a cloud server. Then the cloud server issues the identification result to an App installed in a mobile phone of the customer. The App adds the identification result into a virtual shopping cart and generates the shopping list so as to notify the customer of the shopping list immediately after the item is taken up or put back. When the customer came to a doorway of the store and intends to leave the shopping place, the final payment is completed at the doorway of the store.

Figure 4:
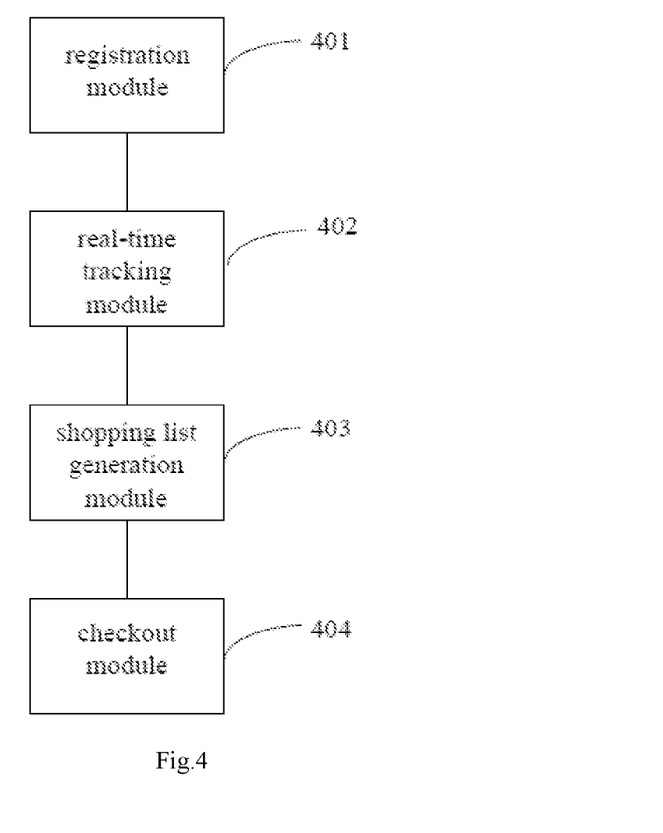
FIG. 4 is a structural schematic diagram of the checkout device provided in an embodiment of the present invention.

With reference to FIG. 4, another embodiment of the present invention provides a checkout device, comprising:

a registration module 401, which is used for receiving identity information inputted by a customer upon registration and acquiring the identity information of the customer who intends to enter a shopping place;

a real-time tracking module 402, which is connected with the registration module 401 and used for tracking the customer, whose identity information has been acquired by the registration module, in the shopping place in real time, and acquiring a position of the customer;

a shopping list generation module 403, which is connected with the real-time tracking module 402 and used for judging whether the position of the customer, which is acquired by the real-time tracking module, is consistent with a position of an item in the shopping place, and if so, the shopping list generation module associates the customer with a take-up action or a put-back action aiming at the item, and the shopping list generation module generates a shopping list of the customer, after identifying the take-up action or the put-back action and the item at which the take-up action or the put-back action aims; and a checkout module 404, which is connected with the shopping list generation module 403 and used for performing checkout of the shopping list generated by the shopping list generation module 403.

Specifically, the shopping list generation module 403 comprises: an association unit configured to represent the position of the item with a position of a forward camera, which is mounted on a shelf for bearing the item and used for shooting forwards, and in case that the identity information of the customer represented by an image containing the customer, which is shot by the forward camera, is the same as the identity information acquired by the registration module, determine that the position of the customer is consistent with the position of the item in the shopping place; an action identification unit configured to acquire a plurality of frames of consecutive hand images of the customer in front of the shelf for bearing the item, and establish a motion track of the hand for the plurality of frames of consecutive hand images on a timeline, in case that it is detected that the motion track of the hand is an inward movement from the outside of a predetermined virtual action boundary and the item is taken in the hand, the action identification unit identifies the action as the put-back action; in case that it is detected that the motion track of the hand is an outward movement from the inside of the virtual action boundary and the item is taken in the hand, the action identification unit identifies the action as the take-up action, wherein the outside of the virtual action boundary is in a direction away from the shelf, and the inside of the virtual action boundary is in a direction close to the shelf; an item identification unit configured to identify the item at which the take-up action or the put-back action aims; and a shopping list generation unit configured to generate the shopping list of the customer, according to the identity information of the customer determined by the association unit, the take-up action or the put-back action identified by the action identification unit, and the item at which the take-up action or the put-back action aims and identified by the item identification unit.

Specifically, the item identification unit comprises: a target detection subunit configured to perform target detection on the plurality of frames of hand images containing the item which are acquired by the action identification unit, in order to obtain a plurality of rectangular area images correspondingly, wherein the rectangular area images are images corresponding to rectangular areas containing the item, and the plurality of frames of hand images correspond to a plurality of cameras in a one-to-one manner; a first classification subunit configured to acquire a plurality of primary classification results correspondingly, according to the plurality of rectangular area images and a pre-trained first-level classification model, and acquire a first-level classification result of the plurality of frames of hand images according to the plurality of primary classification results and a pre-trained first-level linear regression model, wherein the pre-trained first-level classification model is a model that is constructed by an image identification technique of convolutional neural network and trained by all the items in the shopping place; a confirmation unit configured to use the first-level classification result as a first classification result; and a result determination unit configured to use the first classification result as a to-be-identified item.

It should be noted that the specific description on the registration module 401 can refer to the corresponding content of the step S1 in the above-mentioned embodiment, the specific description on the verification association module 402 can refer to the corresponding content of the step S2 in the above-mentioned embodiment, and the specific description on the shopping list generation module 403 can refer to the corresponding content of the step S3 and the steps S31, S32, S33, S34 and S35 in the above-mentioned embodiment, which are not repeated herein.

Figure 5:
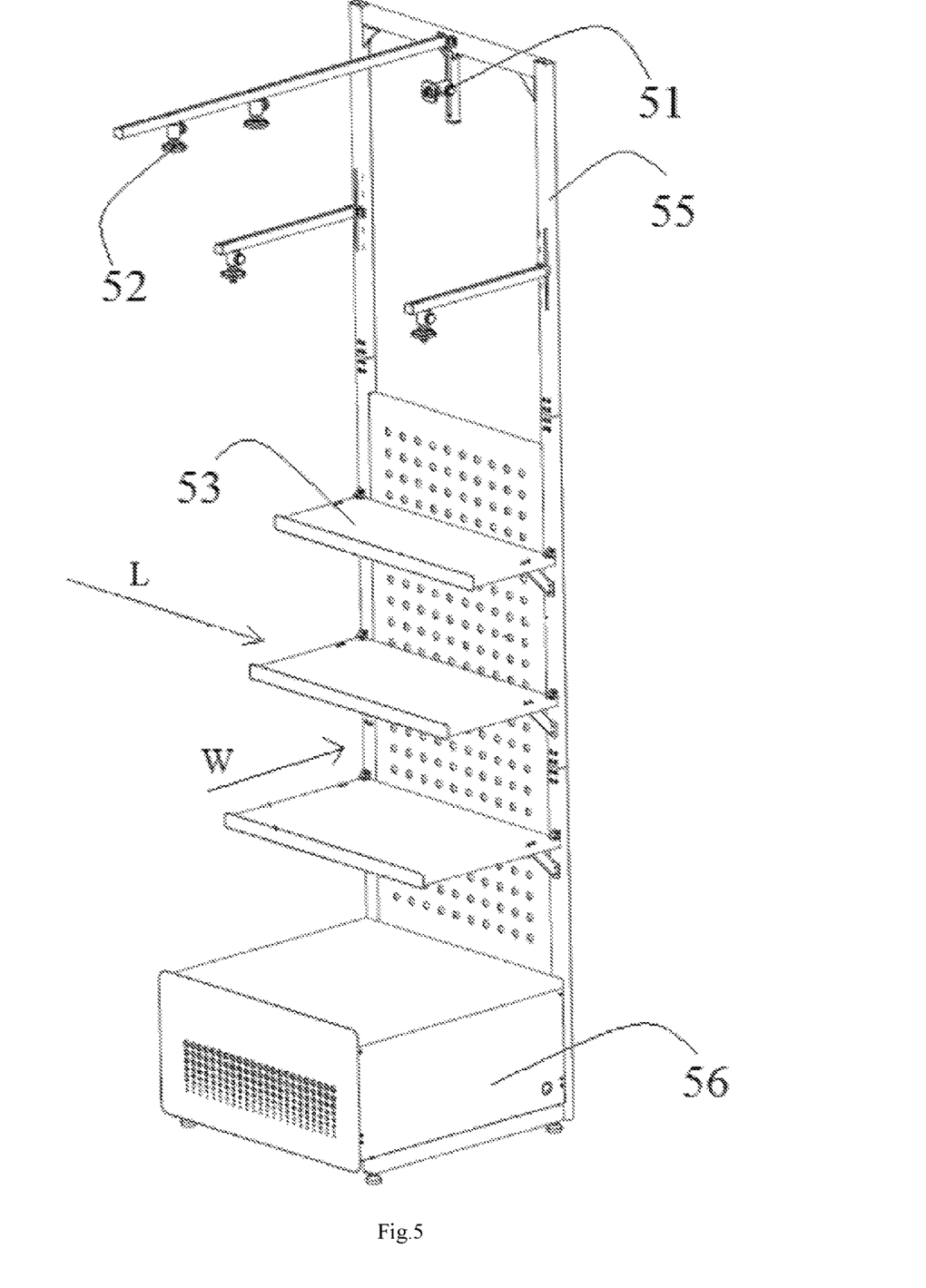
FIG. 5 is a structural schematic diagram of a shelf for a checkout device provided in an embodiment of the present invention.

Still a further embodiment of the present invention provides a checkout device based on an image identification technology of convolutional neural network, comprising: a top camera, a forward camera 51, a lower camera 52, a processor and a memory.

The top camera is used for shooting downwards from the top of a shopping place to track a customer, whose identity information has been acquired, in the shopping place in real time. The forward camera is used for shooting towards the front of a shelf to acquire an image of the customer positioned in front of the shelf for bearing the item. The lower camera is used for shooting downwards to acquire a hand image of the customer. The memory is configured to record processor-executable instructions. The processor is configured to identify the pre-registered customer to acquire the identity information containing face data and a payment account of the customer, control the top camera to track the customer, whose identity information has been acquired, in real time and acquire a position of the customer, judge whether the position of the customer is consistent with a position of the item in the shopping place, which is acquired by controlling the forward camera, and if so, associate the customer with a take-up action or a put-back action aiming at the item, and generate a shopping list of the customer after identifying the take-up action or the put-back action, and the item at which the take-up action or the put-back action aims according to the hand image acquired by the lower camera; and performing checkout of the shopping list.

With reference to FIG. 5, in order to facilitate an accurate identification and more clear and accurate observation for shooting in the checkout method, the checkout device and the undermentioned checkout system, an arrangement of cargoes on each bearing platform 53 is described as follows. A shelf (or called as a shelf for the checkout device) for bearing the items comprises: a base 56, an upright 55 and platforms 53. The base 56 is used for providing a support and arranged on the ground. The upright 55 is arranged on the base 56. The upright 55 may be arranged in a vertical mode. For example, The upright 55 may be arranged at one end of the base 56, so that a combination of the upright 55 and the base 56 is L shape, or may also be arranged at the middle of the upper surface of the base 56, so that the combination of the upright 55 and the base 56 is an inverted T shape, or may be arranged in an inclined mode, which is not limited in the embodiment. A plurality of bearing platforms 53 are sequentially arranged on the same side of the upright 55 in a vertical direction (when the upright 55 is vertically arranged on the base 56, the vertical direction is a length direction of the upright 55), and an interval is reserved between any two adjacent bearing platforms 53, so as to form a space for accommodating to-be-placed cargoes, and the cargoes are placed on each of the bearing platforms 53. One end of the bearing platform 53 away from the upright 55 is a free end. In any two adjacent bearing platforms 53, the free end of the upper bearing platform 55 is closer to the upright 55 than the free end of the lower bearing platform, i.e., widths (i.e., the lengths of the bearing platforms 53 in a horizontal direction in FIG. 5) of a plurality of bearing platforms 53 are increased gradually from top to bottom. The width of the lowermost bearing platform 53 is the maximum. The width of the uppermost bearing platform 53 is the minimum. In this way, when shooting the cargoes from top to bottom, the arrangement of the cargoes on each of the bearing platforms 53 can be more clearly and accurately observed.

In practice, the shelf can be named according to the number of the bearing platforms 53. When a plurality of bearing platforms 53 are provided, the shelf can be called as a multi-layer shelf. Preferably, the number of the bearing platforms 53 is 3 or 4.

The bearing platforms 53 may be a flat plate. The bearing platforms 53 are a continuous body. When the cargoes are placed, the cargoes are placed on the bearing platforms 53, so as to facilitate placement of the cargoes which are heavy and difficult to hang.

In other embodiments, the bearing platform 53 may comprise: a cross bar and a plurality of hanging rods. The cross bar is horizontally arranged on the upright 55. The plurality of hanging rods are vertically arranged in parallel at intervals on the cross bar. At this point, the bearing platforms 53 are an intermittent body. When the cargoes are placed, the cargoes are hung below the hanging rods, i.e., the cargoes are positioned below the bearing platforms 53, so as to facilitate the placement of cargoes which are lightweight and easy to deform in packaging.

The shelf is specifically applicable to the shopping place of "Just Walk Out". The forward camera 51 and the lower camera 52 are arranged at the upper portion of the upright 55. The forward camera 51 shoots towards the front of the shelf (e.g., the left side in FIG. 5), i.e., shooting the customer who is positioned in front of the shelf and selecting cargoes. The lower camera 52 is positioned above the bearing platforms 53. The lower camera 52 shoots downwards from the upper portion of the bearing platforms 53, i.e., shooting the cargoes on the bearing platforms 53. The shooting range of the camera covers the cargoes on the shelf.

Preferably, a plurality of the lower cameras 52 are provided, so that it is ensured that the cargoes selected by the customer may be shot. The plurality of the lower cameras 52 may be sequentially distributed above the bearing platform 53 along the length direction L of the bearing platforms 53. The height of each of the lower cameras 52 may be equal or unequal. The plurality of the lower cameras 52 may be sequentially distributed above the bearing platforms 53 along the width direction W of the bearing platforms 53. The height of each of the lower cameras 52 may be equal or unequal. A part of the plurality of the lower cameras 52 may be sequentially distributed above the bearing platforms 53 along the length direction L of the bearing platforms 53, and the others may be sequentially distributed above the bearing platforms 53 along the width direction W of the bearing platforms, which is not limited in the embodiment. Preferably, four lower cameras are provided, in which two lower cameras are sequentially distributed in the length direction L of the bearing platforms 53, and the others are sequentially distributed in the width direction W of the bearing platforms 53.

Another embodiment of the present invention provides a checkout system comprising: a client terminal for receiving identity information inputted by a customer upon registration and sending the identity information to a checkout device, and receiving a shopping list issued by the checkout device; and the above-mentioned checkout device. Particular details are omitted herein.

From the above, the embodiments of the present invention bring out the following beneficial effects.

The operation cost is low, since the workload caused by adhesion of RFID is saved, compared with a RFID solution. The application range is wide, since the present invention is applicable to any item, and is not restrained by attributes of the item, such as forms, materials and the like. The user experience is good, since the customer can acquire corresponding information immediately after taking an item.

It can be known from common technical knowledge that the present invention can be implemented by other embodiments without departing from the spirit essence or necessary characteristics of the present invention. Therefore, the above-mentioned disclosed embodiments, in all aspects, merely are used for illustration rather than limitation. All changes made in the scope of the present invention or the scope equivalent to the present invention shall fall within the present invention.

What is claimed is:

1. A checkout method comprising the steps of:
   identifying a pre-registered customer to acquire an identity information of the customer, the identity information containing face data and a payment account of the customer;
   tracking the customer whose identity information has been acquired, in a shopping place in real time, and acquiring a position of the customer;
   judging whether the position of the customer is consistent with a position of an item in the shopping place, and if so, associating the customer with a take-up action or a put-back action aiming at the item, and generating a shopping list of the customer after identifying the take-up action or the put-back action, and the item at which the take-up action or the put-back action aims, wherein identifying the item at which the take-up action or the put-back action aims comprises the steps of:
      performing target detection on the plurality of acquired frames of hand images containing the item to obtain a plurality of rectangular area images correspondingly, wherein the rectangular area images are images corresponding to rectangular areas containing the item, and the plurality of frames of hand images corresponds to a plurality of cameras in a one-to-one manner;
      acquiring a plurality of primary classification results correspondingly, according to the plurality of rectangular area images and a pre-trained first-level classification model, and acquiring a first-level classification result of the plurality of frames of hand images, according to the plurality of primary classification results and a pre-trained first-level linear regression model, wherein the pre-trained first-level classification model is a model that is constructed by an image identification technique of convolutional neural network and trained by all the items in the shopping place, when the first-level classification model is trained, the primary classification results outputted by the first-level classification model are used as inputs of the first-level linear regression model, and correct classifications of the items included in the hand images corresponding to the primary classification results are used as outputs of the first-level linear regression model;
   using the first-level classification result as a first classification result; and
   using the first classification result as a to-be-identified item; and
   performing checkout of the shopping list.

2. The checkout method according to claim 1, wherein in the step of judging whether the position of the customer is consistent with a position of an item in the shopping place, and if so, associating the customer with a take-up action or a put-back action aiming at the item, and generating a shopping list of the customer after identifying the take-up action or the put-back action, and the item at which the take-up action or the put-back action aims, judging whether the position of the customer is consistent with the position of the item in the shopping place comprises:
   representing the position of the item with a position of a forward camera which is mounted on a shelf for bearing the item and is used for shooting forwards, in case that the identity information of the customer represented by an image containing the customer, which is shot by the forward camera, is the same as the identity information acquired in the step of identifying a pre-registered customer to acquire an identity information of the customer, the identity information containing face data and a payment account of the customer, judging that the position of the customer is consistent with the position of the item in the shopping place.

3. The checkout method according to claim 1, wherein in the step of judging whether the position of the customer is consistent with a position of an item in the shopping place, and if so, associating the customer with a take-up action or a put-back action aiming at the item, and generating a shopping list of the customer after identifying the take-up action or the put-back action, and the item at which the take-up action or the put-back action aims, identifying the take-up action or the put-back action comprises:

acquiring a plurality of frames of consecutive hand images of the customer in front of the shelf for bearing the item, and establishing a motion track of a hand for the plurality of frames of consecutive hand images on a timeline, in case that it is detected that the motion track of the hand is an inward movement from the outside of a predetermined virtual action boundary and the item is taken in the hand, identifying the action as the put-back action;

in case that it is detected that the motion track of the hand is an outward movement from the inside of the virtual action boundary and the item is taken in the hand, identifying the action as the take-up action, wherein the outside of the virtual action boundary is in a direction away from the shelf, and the inside of the virtual action boundary is in a direction close to the shelf.

4. The checkout method according to claim 1, wherein after the step of acquiring a plurality of primary classification results correspondingly, according to the plurality of rectangular area images and a pre-trained first-level classification model, and acquiring a first-level classification result of the plurality of frames of hand images, according to the plurality of primary classification results and a pre-trained first-level linear regression model, wherein the pre-trained first-level classification model is a model that is constructed by an image identification technique of convolutional neural network and trained by all the items in the shopping place and before the step of using the first classification result as a to-be-identified item, the method further comprises the step of:

obtaining a plurality of secondary classification results correspondingly, according to the plurality of rectangular area images and a pre-trained second-level classification model, acquiring a second-level classification result of the plurality of frames of hand images, according to the plurality of secondary classification results and a pre-trained second-level linear regression model, and using the second-level classification result as the first classification result, in case that the first-level classification result is a similar item, wherein the second-level classification model being a model that is constructed by the image identification technique of convolutional neural network and trained by items in a similar item group in the shopping place in advance; otherwise, executing the step of using the first-level classification result as a first classification result.

5. A checkout device comprising:

a registration module configured to receive identity information inputted by a customer upon registration and acquire the identity information of the customer who intends to enter a shopping place;

a real-time tracking module configured to be connected with the registration module and configured to track the customer, whose identity information has been acquired by the registration module, in the shopping place in real time, and acquire a position of the customer;

a shopping list generation module configured to be connected with the real-time tracking module and configured to judge whether the position of the customer acquired by the real-time tracking module is consistent with a position of an item in the shopping place, and if so, associate the customer with a take-up action or a put-back action aiming at the item, and generate a shopping list of the customer, after identifying the take-up action or the put-back action and the item at which the take-up action or the put-back action aims; and a checkout module configured to be connected with the shopping list generation module and configured to perform checkout of the shopping list generated by the shopping list generation module;

wherein the shopping list generation module comprises an item identification unit configured to identify the item at which the take-up action or the put-back action aims;

the item identification unit comprises:

a target detection subunit configured to perform target detection on the plurality of frames of hand images containing the item which are acquired by the action identification unit, in order to obtain a plurality of rectangular area images correspondingly, wherein the rectangular area images are images corresponding to rectangular areas containing the item, and the plurality of frames of hand images correspond to a plurality of cameras in a one-to-one manner;

a first classification subunit configured to acquire a plurality of primary classification results correspondingly, according to the plurality of rectangular area images and a pre-trained first-level classification model, and acquire a first-level classification result of the plurality of frames of hand images according to the plurality of primary classification results and a pre-trained first-level linear regression model, wherein the pre-trained first-level classification model is a model that is constructed by an image identification technique of convolutional neural network and trained by all the items in the shopping place, when the first-level classification model is trained, the primary classification results outputted by the first-level classification model are used as inputs of the first-level linear regression model, and correct classifications of the items included in the hand images corresponding to the primary classification results are used as outputs of the first-level linear regression model;

a confirmation unit configured to use the first-level classification result as a first classification result; and a result determination unit configured to use the first classification result as a to-be-identified item.

6. The checkout device according to claim 5, wherein the shopping list generation module comprises:

an association unit configured to represent the position of the item with a position of a forward camera, which is mounted on a shelf for bearing the item and used for shooting forwards, in case that the identity information of the customer represented by an image containing the customer, which is shot by the forward camera, is the same as the identity information acquired by the registration module, judge that the position of the customer is consistent with the position of the item in the shopping place;

an action identification unit configured to acquire a plurality of frames of consecutive hand images of the customer in front of the shelf for bearing the item, and establish a motion track of the hand for the plurality of frames of consecutive hand images on a timeline, in case that it is detected that the motion track of the hand is an inward movement from the outside of a predetermined virtual action boundary and the item is taken in the hand, identify the action as the put-back action; in case that it is detected that the motion track of the hand is an outward movement from the inside of the virtual action boundary and the item is taken in the hand, identify the action as the take-up action, wherein the outside of the virtual action boundary is in a direction away from the shelf, and the inside of the virtual action boundary is in a direction close to the shelf; and a shopping list generation unit configured to generate the shopping list of the customer, according to the identity information of the customer determined by the association unit, the take-up action or the put-back action identified by the action identification unit, and the item at which the take-up action or the put-back action aims and identified by the item identification unit.

7. A checkout device comprising:

a top camera configured to shoot downwards from the top of a shopping place to track a customer, whose identity information has been acquired, in the shopping place in real time;

a forward camera configured to shoot towards the front of a shelf to acquire an image of the customer positioned in front of the shelf for bearing an item;

a lower camera configured to shoot downwards to acquire a hand image of the customer;

a processor; and a memory that records processor-executable instructions, wherein the processor is configured to:

identify the pre-registered customer to acquire the identity information containing face data and a payment account of the customer;

control the top camera to track the customer, whose identity information has been acquired, in real time and acquire a position of the customer;

judge whether the position of the customer is consistent with a position of the item in the shopping place, which is acquired by controlling the forward camera, and if so, associate the customer with a take-up action or a put-back action aiming at the item, and generate a shopping list of the customer after identifying the take-up action or the put-back action and the item at which the take-up action or the put-back action aims according to the hand image acquired by the lower camera, wherein identifying the item at which the take-up action or the put-back action aims comprises the steps of:

performing target detection on the plurality of acquired frames of hand images containing the item to obtain a plurality of rectangular area images correspondingly, wherein the rectangular area images are images corresponding to rectangular areas containing the item, and the plurality of frames of hand images corresponds to a plurality of cameras in a one-to-one manner;

acquiring a plurality of primary classification results correspondingly, according to the plurality of rectangular area images and a pre-trained first-level classification model, and acquiring a first-level classification result of the plurality of frames of hand images, according to the plurality of primary classification results and a pre-trained first-level linear regression model, wherein the pre-trained first-level classification model is a model that is constructed by an image identification technique of convolutional neural network and trained by all the items in the shopping place, when the first-level classification model is trained, the primary classification results outputted by the first-level classification model are used as inputs of the first-level linear regression model, and correct classifications of the items included in the hand images corresponding to the primary classification results are used as outputs of the first-level linear regression model;

using the first-level classification result as a first classification result; and using the first classification result as a to-be-identified item; and perform checkout of the shopping list.

8. A checkout system comprising:

a client terminal configured to receive identity information inputted by a customer upon registration and send the identity information to a checkout device, and configured to receive a shopping list issued by the checkout device; and the checkout device comprising:

a registration module configured to receive identity information inputted by a customer upon registration and acquire the identity information of the customer who intends to enter a shopping place;

a real-time tracking module configured to be connected with the registration module and configured to track the customer, whose identity information has been acquired by the registration module, in the shopping place in real time, and acquire a position of the customer;

a shopping list generation module configured to be connected with the real-time tracking module and configured to judge whether the position of the customer acquired by the real-time tracking module is consistent with a position of an item in the shopping place, and if so, associate the customer with a take-up action or a put-back action aiming at the item, and generate a shopping list of the customer, after identifying the take-up action or the put-back action and the item at which the take-up action or the put-back action aims; and a checkout module configured to be connected with the shopping list generation module and configured to perform checkout of the shopping list generated by the shopping list generation module;

wherein the shopping list generation module comprises an item identification unit configured to identify the item at which the take-up action or the put-back action aims; the item identification unit comprises:

a target detection subunit configured to perform target detection on the plurality of frames of hand images containing the item which are acquired by the action identification unit, in order to obtain a plurality of rectangular area images correspondingly, wherein the rectangular area images are images corresponding to rectangular areas containing the item, and the plurality of frames of hand images correspond to a plurality of cameras in a one-to-one manner;

a first classification subunit configured to acquire a plurality of primary classification results correspondingly, according to the plurality of rectangular area images and a pre-trained first-level classification model, and acquire a first-level classification result of the plurality of frames of hand images according to the plurality of primary classification results and a pre-trained first-level linear regression model, wherein the pre-trained first-level classification model is a model that is constructed by an image identification technique of convolutional neural network and trained by all the items in the shopping place, when the first-level classification model is trained, the primary classification results outputted by the first-level classification model are used as inputs of the first-level linear regression model, and correct classifications of the items included in the hand images corresponding to the primary classification results are used as outputs of the first-level linear regression model;

a confirmation unit configured to use the first-level classification result as a first classification result; and a result determination unit configured to use the first classification result as a to-be-identified item.

* * * * *